(12) United States Patent
Nacy

(10) Patent No.: US 10,752,133 B2
(45) Date of Patent: Aug. 25, 2020

(54) MULTIDIRECTIONAL CLOCK SPRING WITH ROTATING ARBOR

(71) Applicant: Magna Seating Inc, Aurora (CA)

(72) Inventor: Michael D Nacy, Lake Orion, MI (US)

(73) Assignee: Magna Seating Inc, Aurora, Ontario (CA)

( * ) Notice: Subject to any disclaimer, the term of this patent is extended or adjusted under 35 U.S.C. 154(b) by 33 days.

(21) Appl. No.: 15/978,602

(22) Filed: May 14, 2018

(65) Prior Publication Data

US 2018/0326873 A1 Nov. 15, 2018

Related U.S. Application Data

(60) Provisional application No. 62/505,171, filed on May 12, 2017.

(51) Int. Cl.
*B60N 2/22* (2006.01)
*F16F 1/10* (2006.01)
*B60N 2/20* (2006.01)

(52) U.S. Cl.
CPC ............ *B60N 2/22* (2013.01); *B60N 2/20* (2013.01); *B60N 2/206* (2013.01); *F16F 1/10* (2013.01)

(58) Field of Classification Search
CPC .. B60N 2/22; B60N 2/206; B60N 2/20; F16F 1/10

USPC ........................................ 297/378.1; 267/156
See application file for complete search history.

(56) References Cited

U.S. PATENT DOCUMENTS

| | | | |
|---|---|---|---|
| 7,543,890 B1 | 6/2009 | Sasaki et al. | |
| 7,878,595 B2 * | 2/2011 | Imajou | B60N 2/3011 |
| | | | 297/367 R |
| 8,348,346 B2 | 1/2013 | Li | |
| 8,777,194 B2 | 7/2014 | Okura et al. | |
| 8,955,912 B2 * | 2/2015 | Brines | A47C 1/024 |
| | | | 297/354.1 |
| 2008/0315654 A1 * | 12/2008 | Boudinot | B60N 2/3065 |
| | | | 297/378.1 |
| 2011/0089736 A1 | 4/2011 | Seibold et al. | |

FOREIGN PATENT DOCUMENTS

KR 20140087550 7/2014

* cited by examiner

*Primary Examiner* — Milton Nelson, Jr.
(74) *Attorney, Agent, or Firm* — Miller Canfield

(57) ABSTRACT

A multidirectional clock spring assembly with a rotating arbor is disclosed for an automotive seat of the type wherein a seat back thereof may be pivoted between a rearward reclined position and a forward fold flat position overlying a seat cushion thereof. The clock spring provides a biasing force to move the seat back from the reclined position towards an upright position, and further for biasing the clock spring to provide a biasing force to move the seat back from the fold flat position towards the upright position.

20 Claims, 11 Drawing Sheets

MULTIDIRECTIONAL CLOCK SPRING WITH ROTATING ARBOR

BACKGROUND OF THE INVENTION

1. Field of the Invention

The present invention relates to a multidirectional clock spring with a rotating arbor assembly for an automotive seat assembly. More specifically, the invention relates to a seat assembly having a seat back pivotally coupled to a seat cushion and having a multidirectional clock spring to provide a forward biasing force to move the seat back from a reclined position towards an upright position, and further to provide a rearward biasing force to move the seat back from a fold flat position towards the upright position.

2. Description of the Related Art

Most automotive seats are provided with a reclining device operable for allowing the seat back to pivot rearwardly from an upright seating position to a reclined position for occupant comfort and also pivot forwardly to a fold flat position overlying the seat cushion. The reclining device may have a locking mechanism provided with a control lever which is operable to either place the seat back in a locked state or release the seat back from the locked state.

A clock spring is typically used as a means for giving a biasing force to the seat back in the forward direction of the seat pivoting motion in order to enable a user to easily and quickly move the seat back from a reclined position towards the upright position and/or fold the seat back onto the seat cushion in the fold flat position. However, when the user moves the seat back from the fold flat position towards the upright position, the user may be required to apply additional force to counteract the forward biasing force of the clock spring.

An alternative mechanism comprises a stationary spring tab attached to the seat cushion such that when the seat back is pivoted in the forward direction the stationary spring tab engages with an end of the clock spring and results in the clock spring ceasing application of the forward biasing force. Thus, the seat back may be rotated from the upright position to the fold flat position without a forward biasing force being applied by the clock spring. Therefore, when the user lifts and returns the seat back from the fold flat position towards the upright position, the user does not have to provide additional force to counteract the forward biasing force of the clock spring.

However, with both of these seat assemblies, the user may have difficulty lifting the seat back from the fold flat position due to the weight of the seat back.

It is therefore desirable to provide an improved reclining device having a multidirectional clock spring assembly which provides a forward biasing force when the seat back is pivoted rearward from the upright position to a reclined position and provides a reverse or rearward biasing force when the seat back is pivoted forwardly from the upright position to the fold flat position.

SUMMARY OF THE INVENTION

One aspect of the present invention is a reclining device for use in an automotive seat including a multidirectional clock spring assembly with a rotating arbor which generates both a forward biasing force when the seat back has been moved rearwardly away from an upright position and a rearward biasing force when the seat back has been moved forwardly away from the upright position. As such, when the reclining device is in the full upright position, the clock spring assembly is in a transition position with the clock spring having a first amount of tension; when the reclining device is rotated rearwardly in a first direction from the full upright position to a full recline position which repositions the clock spring assembly into the full recline position, the clock spring provides a second amount of tension to bias the reclining device towards the full upright position; and when the reclining device is rotated forwardly in a second direction from the full upright position to a fold flat position which repositions the clock spring assembly into the fold flat position, the clock spring provides a third amount of tension to bias the reclining device back towards the full upright position.

Another aspect of the present invention is a multidirectional clock spring assembly for an automotive seat comprising a pivot shaft having an axis of rotation defining a forward direction and a reverse direction of rotation for the seat back. A travelling spring tab is configured to rotate with the seat back about the pivot shaft axis of rotation and is positioned at a first radial distance from the pivot shaft axis of rotation and having a transition position, the travelling spring tab having a front leading edge and a rear leading edge. A stationary spring tab is positioned at a second radial distance from the pivot shaft axis of rotation, the stationary spring tab comprising a forward leading edge and a reverse leading edge, and the reverse leading edge generally aligned with the rear leading edge when the travelling spring tab is in the transition position. An arbor plate is configured to rotate about the pivot shaft axis of rotation, the arbor plate further comprising an arbor plate tab and a spring arbor, the arbor plate tab positioned at a third radial distance from the pivot shaft axis of rotation, and the spring arbor positioned at a fourth radial distance from the pivot shaft axis of rotation, the arbor plate tab configured to be releasably engagable with the travelling spring tab and with the stationary spring tab, wherein an arbor leading edge is releasably engaged with the forward leading edge of the stationary spring tab when the travelling spring tab is in the transition position. A clock spring is positioned adjacent the arbor plate and preferably aligned with the pivot shaft axis of rotation, the clock spring having an internal spring end operatively connected to the spring arbor and an external spring end configured to be releasably engagable with the travelling spring tab during rearward movement of the seat back and with the stationary spring tab during forward movement of the seat back. When the travelling spring tab is in the transition position the external spring end is releasably engaged with the reverse leading edge of the stationary spring tab and with the rear leading edge of the travelling spring tab, the arbor leading edge is releasably engaged with the forward leading edge of the stationary spring tab, and the clock spring has a first amount of tension; when the travelling spring tab rotates in the reverse direction away from the transition position, the external spring end disengages from the stationary spring tab and the external spring end is operationally engaged with the travelling spring tab; and when the travelling spring tab rotates in the forward direction away from the transition position, the external spring end disengages from the travelling spring tab and operationally engages with the stationary spring tab, the front leading edge of the travelling spring tab releasably engages with the arbor leading edge.

Another aspect of the present invention is a multidirectional clock spring assembly for an automotive seat comprising a travelling spring tab rotationally attached to a lower support bracket of the seat back, the travelling spring tab rotationally movable between a forward position and a rear position about an axis of rotation, the travelling spring tab further having a transition position between the forward position and the rear position. A stationary spring tab is rigidly attached to the lower support bracket. An arbor plate is configured to rotate about the axis of rotation, the arbor plate further comprising an arbor plate tab and a spring arbor, the arbor plate tab releasably engaged with the stationary spring tab when the travelling spring tab is in the rear position and when the travelling spring tab is in the transition position, and the arbor plate tab releasably engaged with the travelling spring tab and disengaged from the stationary spring tab when the travelling spring tab is in the forward position. A clock spring is positioned adjacent the arbor plate and has an internal spring end operationally connected to the spring arbor and an external spring end releasably engaged with the travelling spring tab when the travelling spring tab is in the transition position and in the rear position. The external spring end is disengaged from the travelling spring tab and releasably engaged with the stationary spring tab when the travelling spring tab is in the forward position; wherein the clock spring provides a biasing force oriented towards the transition position when the travelling spring tab is in the rear position, and the clock spring provides a biasing force oriented towards the transition position when the travelling spring tab is in the forward position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENTS

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 1:
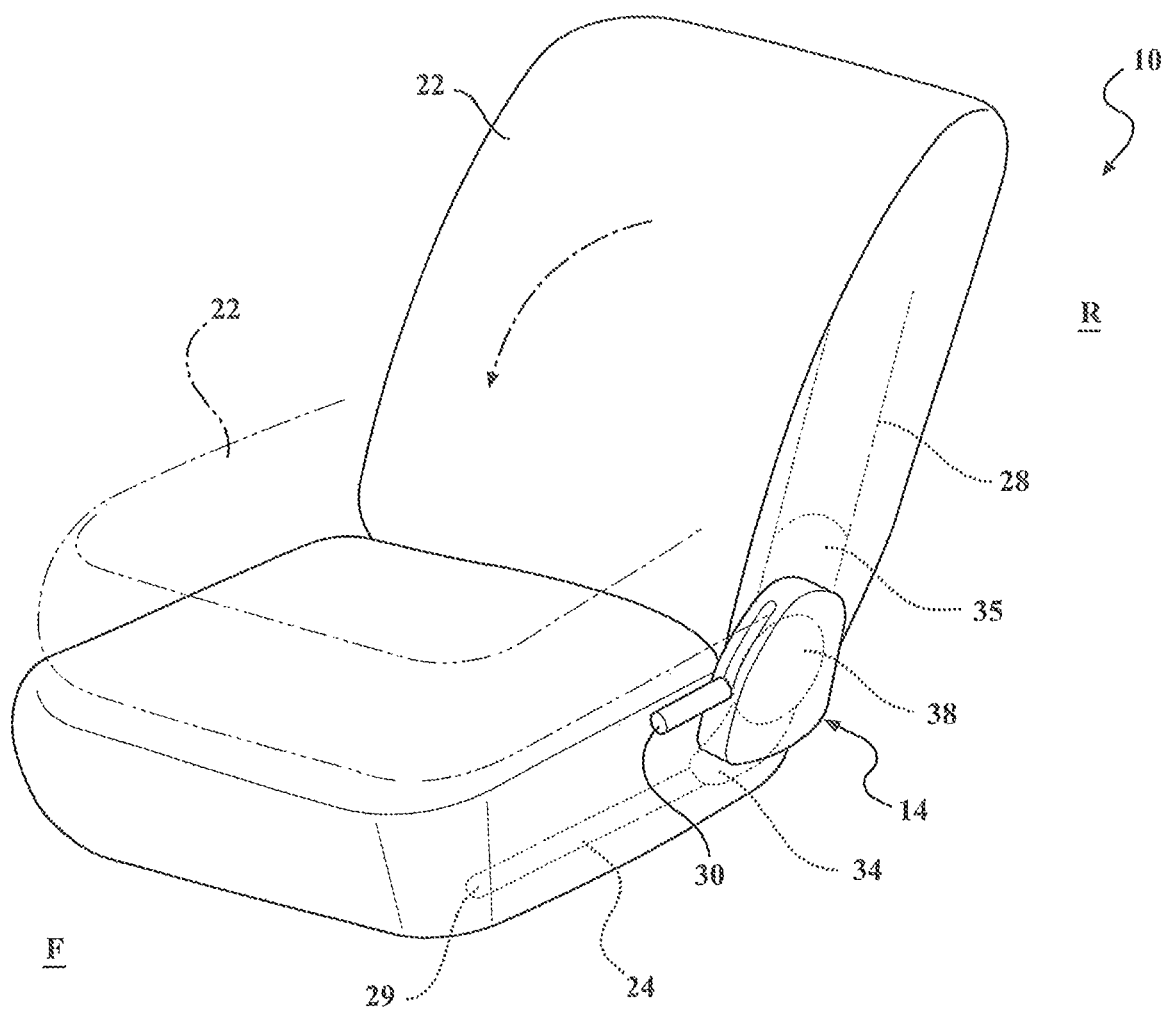
FIG. 1 is a perspective view of a seat assembly for an automotive vehicle according to one aspect of the present invention which comprises a reclining device pivotally coupling a seat back to a seat cushion.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to FIGS. 1 to 10, there are illustrated exemplary modes of a seat assembly structure for an automotive vehicle, as generally designated by 10, in accordance with the present invention.

FIG. 1 shows a perspective view of the seat assembly 10 having a reclining device 14 which comprises a multidirectional, rotatable-arbor, clock spring assembly 18 (referred to hereafter as "clock spring assembly" 18). The seat assembly 10 comprises a seat back 22 and a seat cushion 24. While only diagrammatically shown, it is to be understood that the seat back 22 has a seat back frame member 28 provided therein, while the seat cushion 24 has a seat cushion frame member 29 provided therein, for supporting a cellular foam pad encased in a trim cover as is commonly known in the field of automotive seating.

It is noted that the terms "forward", "ahead" or "forwardly", refer to a direction towards a forward side F facing forwardly of the seat 10, whereas the terms "reverse", "backward", "backwardly", "recline", "rear", "rearward", or "rearwardly", refer to a direction towards a rear side R facing rearwardly of the seat 10.

Figure 2:
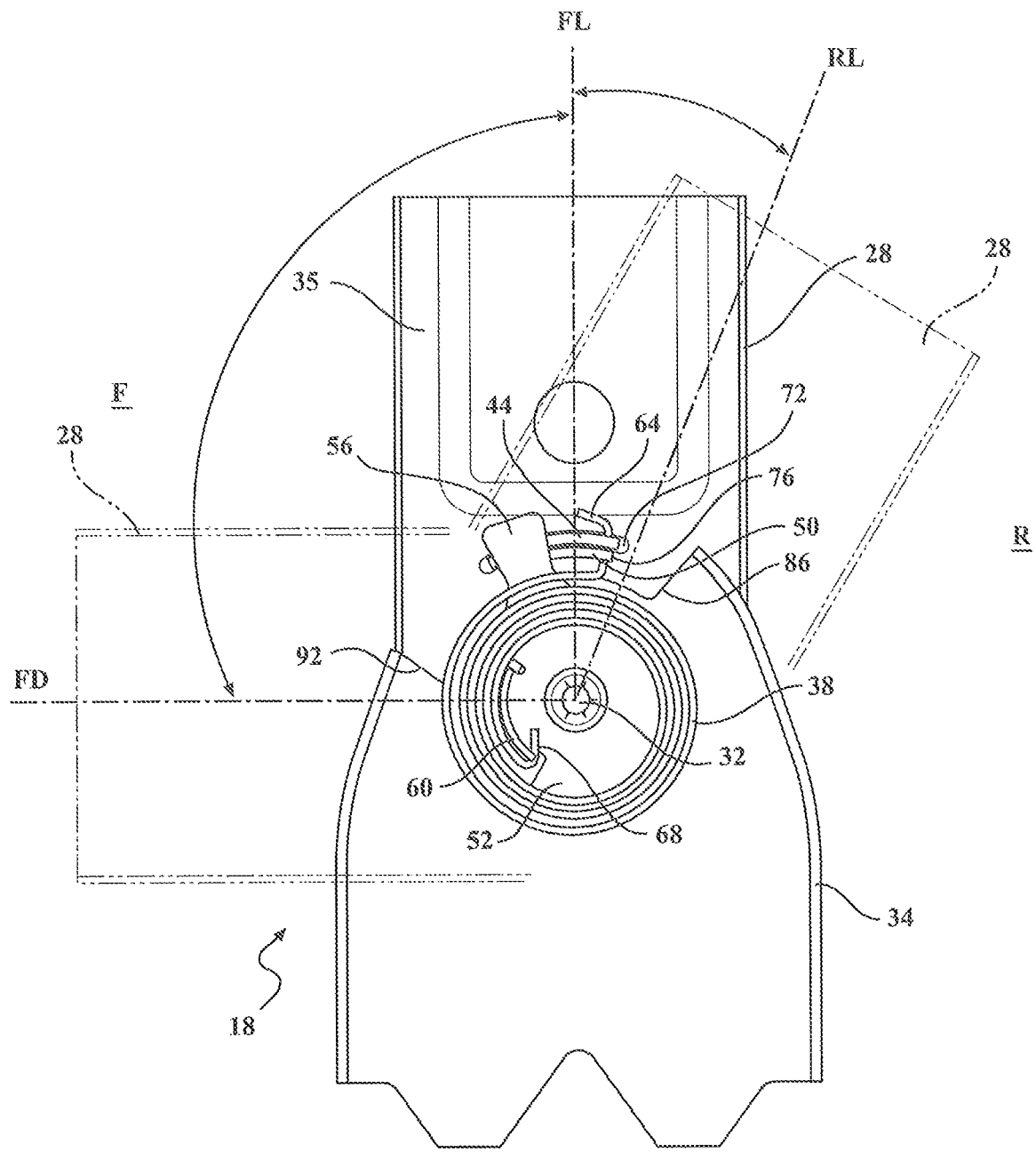
FIG. 2 is a fragmentary side view of a reclining device including a clock spring assembly with the seat back shown in fold flat position, full upright position, and full recline position according to one aspect of the present invention with the reclining device and the clock spring assembly in the full upright (transition) position.

Referring to FIG. 2, the reclining device 14 has a control lever 30 and a locking mechanism (not shown), and is operatively connected between the seat back 22 and the seat cushion 24 for controlling actuation of the reclining device 14 to provide pivotal movement of the seat back 22 relative to the seat cushion 24. A pivot shaft 32 forms an axis of rotation about which the seat back 22 is rotated forwardly and rearwardly in a direction towards and away from the seat cushion 24.

The locking mechanism may be any type as is commonly known in the art, and any specific description thereof is eliminated for the sake of simplicity in description. Briefly stated, the locking mechanism may be actuated by a locking operation of the control lever 30 to place the reclining device 14 in a locked state, thereby locking the seat back 22 against pivotal movement, and also may be actuated by an unlocking operation of the control lever 30 to release the reclining device 14 from the locked state, thereby allowing the seat back 22 to be pivoted forwardly and rearwardly in a direction toward and away from the seat cushion 24.

As far as the present embodiment is concerned, the reclining device 14 is operatively connected between a lower recliner bracket 34 extending from the seat cushion frame member 29 and an upper recliner bracket 35 defined by a lower end portion of the seat back frame member 28. Though not shown, the lower recliner bracket 34 may be fixed to a floor of a vehicle or a track assembly slidably coupling the seat 10 to the floor. The upper recliner bracket 35, and thus the seat back frame member 28, rotates relative to the lower recliner bracket 34, and thus the seat cushion frame member 29, about the pivot shaft 32.

FIG. 2 shows a partially broken perspective side view of a portion of the reclining device 14 including the clock spring assembly 18 with the reclining device 14 and the clock spring assembly 18 in the full upright (transition) position. The clock spring assembly 18 has a clock spring 38 provided therein. The clock spring 38 is commonly referred to as a "spiral spring", "spiral torsion spring", or a "flat coil spring".

Also shown in the embodiment of FIG. 2, the clock spring assembly 18 further comprises a travelling spring tab 44, a stationary spring tab 50, and a rotating arbor plate 52. The travelling spring tab 44 may be rigidly attached or fixedly secured to the seat back frame member 28 so as to rotate forwardly and rearwardly therewith. The travelling spring tab 44 may be integrally formed with the seat back frame member 28 or may be mechanically fastened or welded to the seat back frame member 28. The stationary spring tab 50 may be rigidly fastened or integrally formed with the lower recliner bracket 34 so as to remain stationary during movement of the seat back 22. The stationary spring tab 50 may be fixedly secured to the lower recliner bracket 34. The arbor plate 52 is rotatably supported on the pivot shaft 32 and further comprises an arbor plate tab 56 and a spring arbor 60. The clock spring 38 further comprises an external spring end 64 and an opposite internal spring end 68. The internal spring end 68 is operationally engaged with the spring arbor 60 and the external spring end 64 operatively cooperates with the travelling spring tab 44 and the stationary spring tab 50 depending on the direction of movement of the seat back 22 as will be described below.

The forward and backward reclining angles of the seat back 22 (and respectively the seat back frame member 28) are limited as indicated by the two respective designations FL and RL shown in FIG. 2. In other words, the seat back 22 (i.e. the seat back frame member 28) can be pivotally reclined by operation of the reclining device 14 within a certain angle of inclination between the forward limit point FL and the recline limit point RL. The forward limit point FL is defined to be a position of the seat back 22 where a backward edge 72 of the travelling spring tab 44 is aligned with a rear leading edge 76 on the stationary spring tab 50, as far as an illustrative embodiment is concerned. The forward limit point FL may also be referred to as "transition", "transition point", "full upright position", or "full upright".

Figure 3:
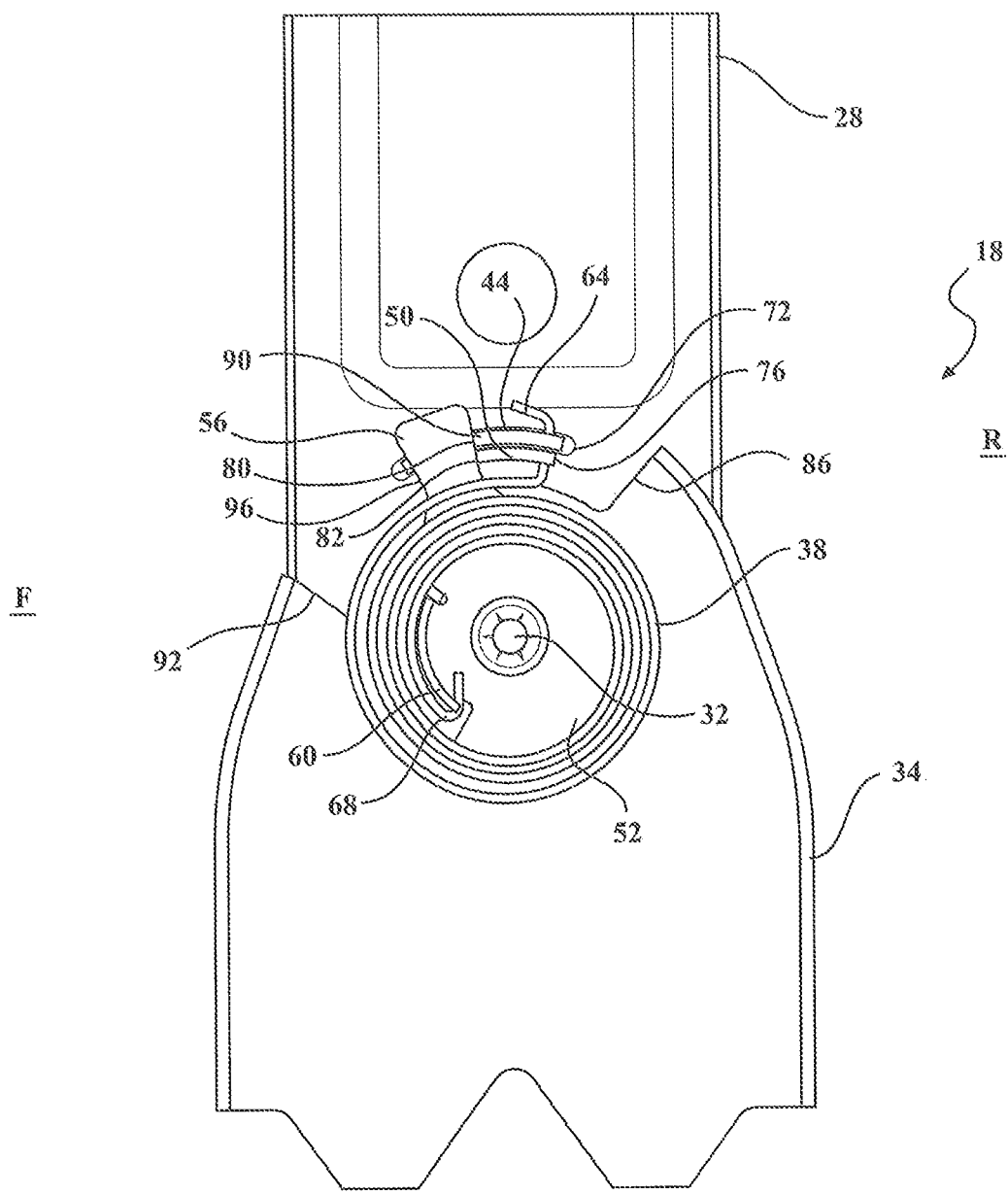
FIG. 3 is an enlarged side view of the reclining device and clock spring assembly as shown in FIG. 2 with the seat back and the clock spring assembly in the full upright (transition) position.

FIG. 3 shows an enlarged partially broken side view of a portion of the seat back frame member 28 in the full upright position FL. When the seat back frame member 28 is in the full upright position the clock spring assembly 18 is in a transition position. In the transition position, the travelling spring tab 44 contacts the arbor plate 52 and the external spring end 64 contacts both the stationary spring tab 50 and the travelling spring tab 44. In more detail, the backward edge 72 of the travelling spring tab 44 is engaged with the external spring end 64 of the clock spring 38, and the rear leading edge 76 of the stationary spring tab 50 is also engaged with the external spring end 64 of the clock spring 38. A rear leading edge 80 of the arbor plate tab 56 is engaged with a forward leading edge 82 of the stationary spring tab 50, which limits counter-clockwise or rearward rotation of the arbor plate 52. In the full upright position FL the biasing force of the clock spring 38 is carried by the stationary spring tab 50, and thus the seat back frame member 28 is essentially not subject to a substantial biasing force by the clock spring 38.

Figure 4:
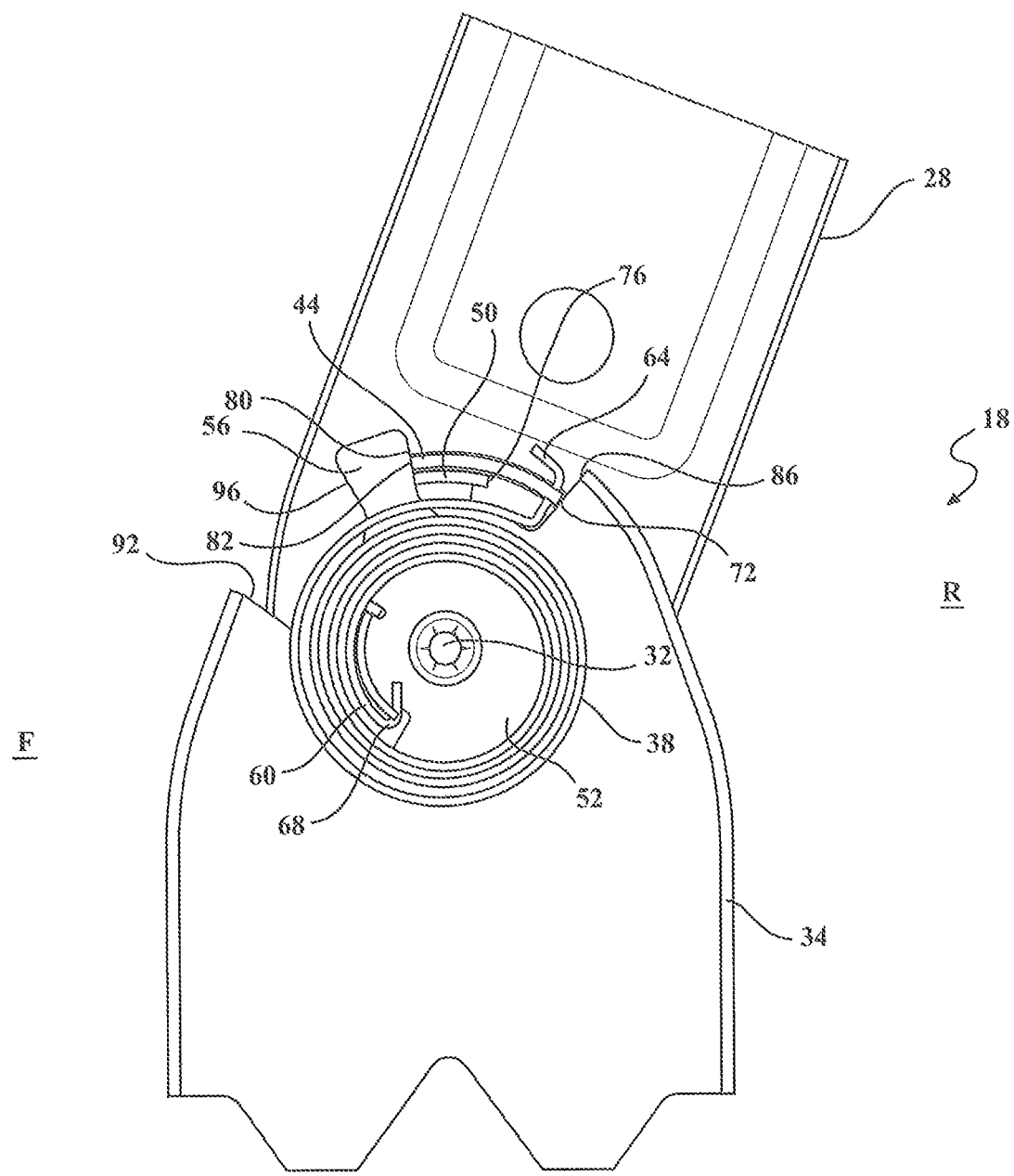
FIG. 4 is an enlarged side view of the reclining device and the clock spring assembly as shown in FIG. 2 with the seat back and the clock spring assembly in the full recline position.

FIG. 4 shows an enlarged partially broken side view of the seat back frame member 28 in the recline position at the backward recline limit point RL. It is noted that, in an embodiment of the disclosed invention, the recline limit point RL is defined to be a point where the backward edge 72 of the travelling spring tab 44 is contacting a rear stopper portion 86 formed in the lower recliner bracket 34. The recline limit point RL may also be referred to as "full recline", "recline position", or "full recline position".

In the recline position, the travelling spring tab 44 has been rotated with respect to the axis of rotation of the pivot shaft 32 in a clockwise direction until the backward edge 72 of the travelling spring tab 44 engages the rear stopper portion 86 in the lower recliner bracket 34. In this position, the rear leading edge 80 of the arbor plate tab 56 is still engaged with the forward leading edge 82 of the stationary spring tab 50. In the full recline position RL, external spring end 64 is rotated clockwise by the seat back 22 through motion of travelling spring tab 44. As a result, a forward biasing force is generated by displacing the external spring end 64 rearwardly, which places the clock spring 38 in tension. The clock spring 38 provides the forward biasing force when the seat back frame member 28 is in the recline position at the backward recline limit point RL. When the seat locking mechanism is released (not shown), the forward biasing force applied by the clock spring 38 assists in rotating the seat back frame member 28 from the backward limit point RL towards the full upright position FL.

Figure 5:
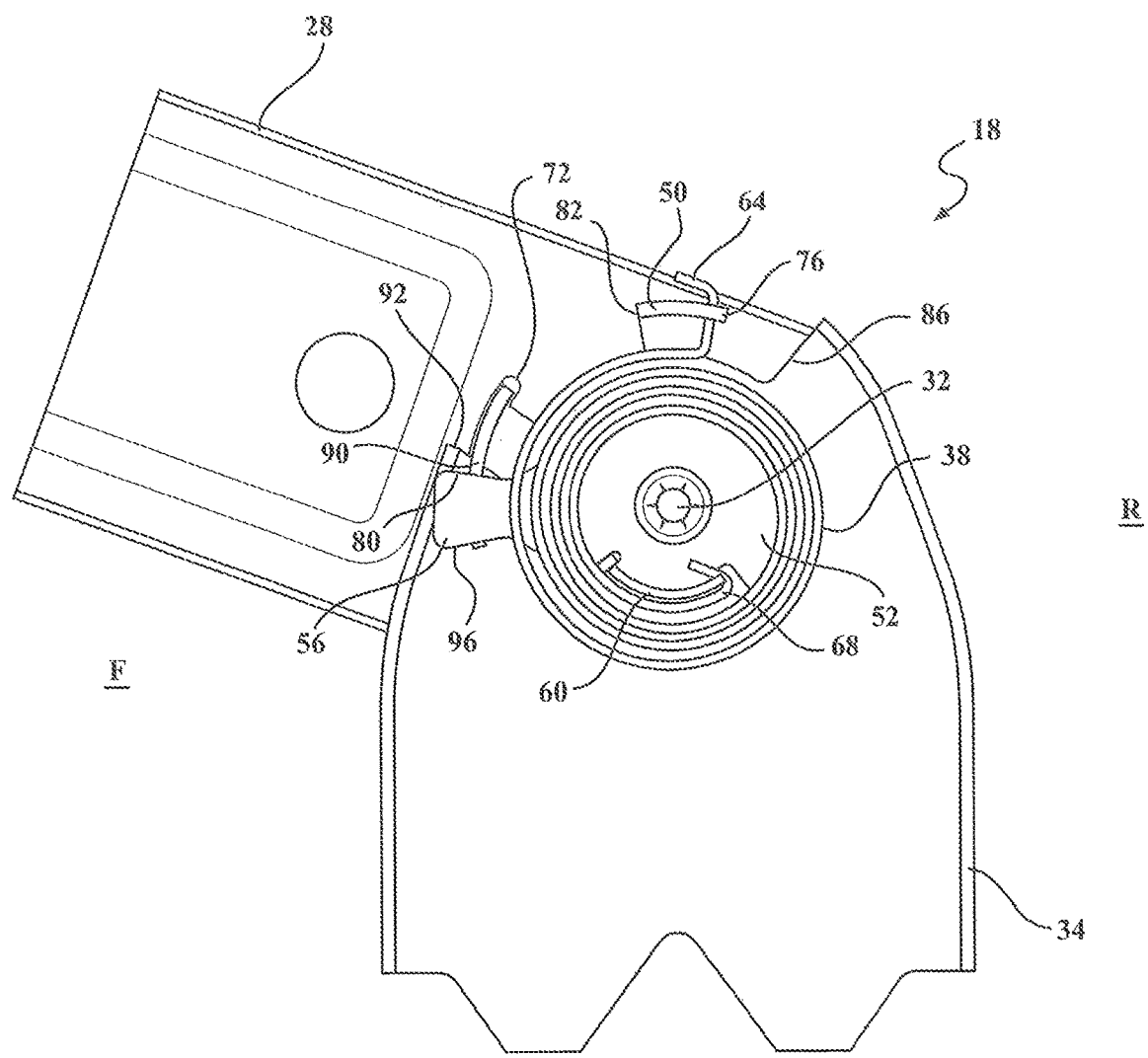
FIG. 5 is an enlarged side view of the reclining device and the clock spring assembly as shown in FIG. 2 with the seat back and the clock spring assembly in the fold flat position.

With respect to forward folding of the seat back 22, FIG. 5 shows a partially broken side view the seat back frame member 28 in the fold flat position at a fold down limit point FD. It is noted that the fold down limit point FD is defined to be a point where a forward leading edge 90 of the travelling spring tab 44 contacts a fold down stopper portion 92 formed in the lower recliner bracket 34.

In the fold flat position, as shown in FIG. 5, the travelling spring tab 44 has been rotated with respect to the pivot shaft 32 axis of rotation in the counter-clockwise direction until the forward leading edge 90 of the travelling spring tab 44 engages the fold down stopper portion 92 in the lower recliner bracket 34. In this position, the rear leading edge 80 of the arbor plate tab 56 is engaged with the forward leading edge 90 of the travelling spring tab 44. While the travelling spring tab 44 continues to rotate forwardly past the stationary spring tab 50, the external spring end 64 catches on the stationary spring tab 50 and stops thereat during forward movement of the seat back 22 from the position FL. In the fold flat position, the arbor plate 52 is rotated counter-clockwise by the travelling spring tab 44 on the seat back 22. When the arbor plate tab 56 is rotated counter-clockwise with respect to the pivot shaft 32 axis of rotation by engagement with the travelling spring tab 44, the spring arbor 60 is also rotated counter-clockwise with respect to the pivot shaft 32 which displaces the internal spring end 68 about the axis of rotation and resists rotation of the arbor plate 52 by placing the clock spring 38 in tension. The counter-clockwise rotation of the spring arbor 60 results in a rearward biasing force in the clock spring 38 since the external spring end 64 of the clock spring 38 is engaged with the rear leading edge 76 of the stationary spring tab 50 and the internal spring end 68 is engaged with the spring arbor 60. Thus, the clock spring 38 provides a rearward biasing force when the seat back frame member 28 is in the fold flat position at the fold down limit point FD. When the seat back 22 is lifted from the fold flat position, the rearward biasing force applied by the clock spring 38 assists in rotating the seat back frame member 28 rearwardly from the fold flat position towards the full upright position FL.

As shown in FIGS. 2-5, the seat back 22 (and respectively the seat back frame member 28) and the travelling spring tab 44 rotate clockwise with respect to the pivot shaft 32 axis of rotation when moving from the forward limit point FL to the recline limit point RL. The seat back 22 (and respectively the seat back frame member 28) and the travelling spring tab 44 rotate counter-clockwise with respect to the pivot shaft 32 axis of rotation when moving from the forward limit point FL to the fold down point FD. It should be appreciated that the seat assembly and rotational directions may be orientated in a mirror image and opposite direction without varying from the scope of the invention.

Alternatively, the forward limit point FL, the recline limit point RL, and the fold down point FD may be any three distinct angles of rotation about the pivot shaft 32 axis of rotation, i.e., the fold down point FD may be any angle with respect to the axis of rotation of the pivot shaft 32 between the forward limit point FL (or the rotational position with respect to the pivot shaft 32 axis of rotation designated as a "full upright" position) and a forward rotational angle represented by the maximum forward angle of rotation of the seat back 22 about the axis of rotation of the pivot shaft 32. As an alternative example, the fold down point FD may be any forward rotational angle with respect to the pivot shaft 32 axis of rotation with respect to the specific "full upright" position without fully rotating the seat back 22 onto the seat cushion 24.

Likewise, the recline limit point RL which represents the full recline position may be represented by any angle of rotation with respect to the pivot shaft 32 axis of rotation that is between the forward limit point FL and a reverse rotational angle with respect to the pivot shaft 32 axis of rotation represented by the maximum reverse angle of rotation of the seat back 22 about the axis of rotation of the pivot shaft 32.

As the travelling spring tab 44 rotates forward (or counter-clockwise) past the stationary spring tab 50 as shown in the embodiment of FIG. 5, the forward leading edge 90 of the travelling spring tab 44 engages with the arbor plate tab 56 attached to the arbor plate 52. The arbor plate 52 may rotate relative to the pivot shaft 32 axis of rotation counter-clockwise until the forward leading edge 90 of the travelling spring tab 44 engages the fold down stopper portion 92 of the lower recliner bracket 34. Conversely, the arbor plate 52 may rotate relative to the pivot shaft 32 axis of rotation in the clockwise direction until the rear leading edge 80 of the arbor plate tab 56 engages with the forward leading edge 82 of the stationary spring tab 50.

As shown in FIG. 2, the arbor plate 52 further comprises the spring arbor 60 to which the internal spring end 68 of the clock spring 38 is attached. As the arbor plate 52 is rotated around the pivot shaft 32 axis of rotation, the spring arbor 60 is also rotated which repositions the internal spring end 68 of the clock spring 38. When the travelling spring tab 44 rotates counter-clockwise past the stationary spring tab 50 and the forward leading edge 90 of the travelling spring tab 44 engages the arbor plate tab 56, the travelling spring tab 44 rotates the arbor plate tab 56 in the counter-clockwise direction which also rotates the spring arbor 60 in the counter-clockwise direction. Since the external spring end 64 of the clock spring 38 is engaged with the rear leading edge 76 of the stationary spring tab 50, counter-clockwise rotation of the spring arbor 60 increases the tension in the clock spring 38 and results in a rearward biasing force in the clock spring 38. When moving the seat back 22 from the fold down point FD to the forward limit point FL, the rearward biasing force assists in lifting the seat back 22 by counteracting the weight of the seat back 22.

In accordance with the present invention, generically stated, the travelling spring tab 44 and the stationary spring tab 50 are provided for engagement with the outward movable external spring end 64 of the clock spring 38 wherein the clock spring 38 applies a forward biasing force when the travelling spring tab 44 is positioned clockwise of the stationary spring tab 50 with respect to the pivot shaft 32 axis of rotation, and further the arbor plate 52 with the spring arbor 60 are provided for engagement with the movable internal spring end 68 of the clock spring 38, wherein the clock spring 38 applies a rearward biasing force when the travelling spring tab 44 is positioned counter-clockwise of the stationary spring tab 50 with respect to the pivot shaft 32 axis of rotation, are novel characteristic features of the invention.

Figure 6:
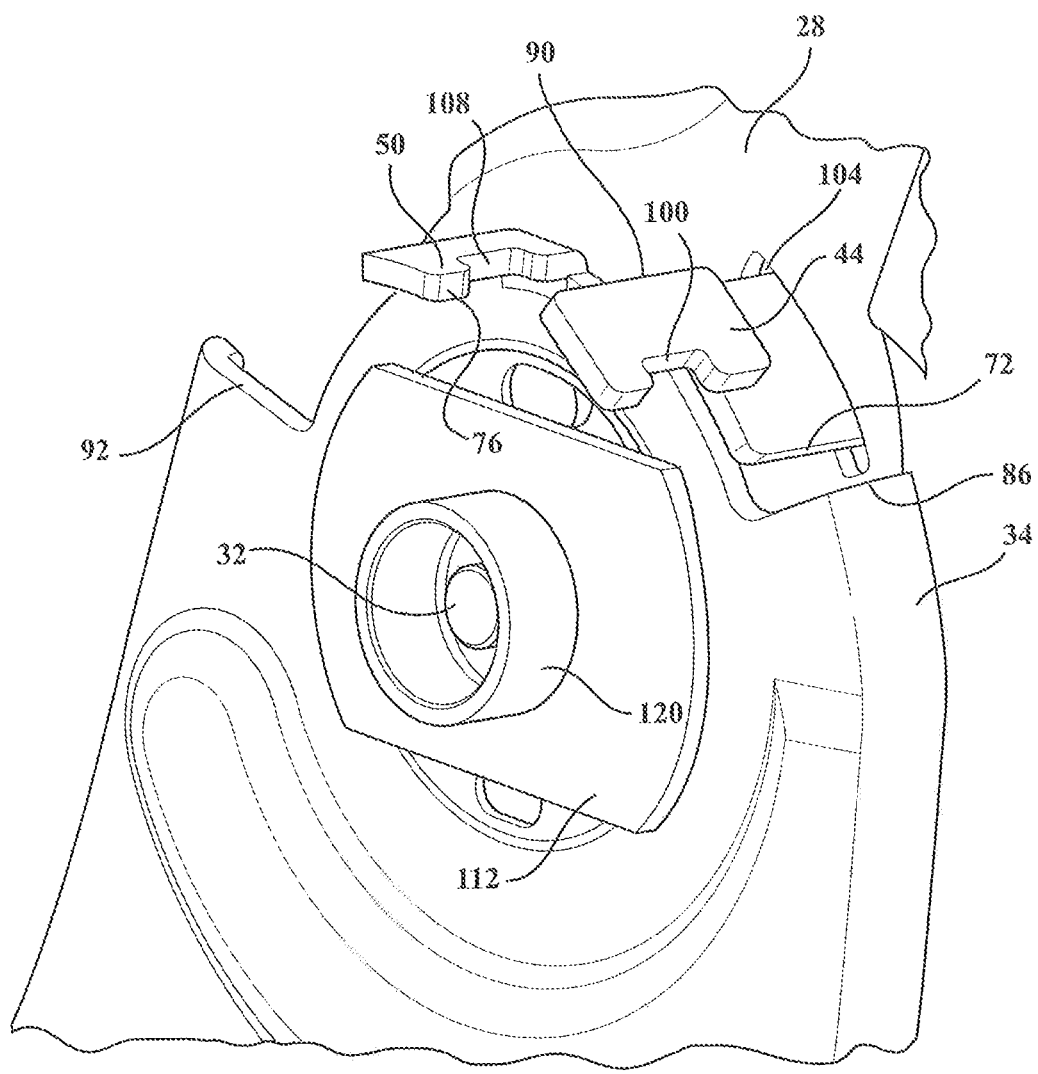
FIG. 6 is a fragmentary perspective view of the clock spring assembly, with an arbor plate and a clock spring removed, according to one aspect of the present invention as shown in FIG. 2.

FIG. 6 shows a side perspective cutaway view of the reclining device 14 with the clock spring 38 and the arbor plate 52 removed from the reclining device 14. An embodiment of the travelling spring tab 44 is shown comprising the first rear portion 72 forming the backward edge 72 of the travelling spring tab 44 which will engage with the rear stopper portion 86 in the lower recliner bracket 34 when the travelling spring tab 44 (and the seat back frame member 28) are rotated clockwise with respect to the pivot shaft 32 axis of rotation to the recline limit point RL. As shown in FIG.

6, the travelling spring tab 44 further comprises a notch 100 for releasably engaging the external spring end 64 of the clock spring 38.

Also shown in FIG. 6, the travelling spring tab 44 further comprises the first forward leading edge 90 which releasably engages the arbor plate tab 56 when the travelling spring tab 44 rotates in the counter-clockwise direction with respect to the pivot shaft 32 axis of rotation past the position of the stationary spring tab 50. In the embodiment shown in FIG. 6, the travelling spring tab 44 further comprises a second forward leading edge portion 104 for releasably engaging the fold down stopper portion 92 in the lower recliner bracket 34. The stationary spring tab 50 shown in the embodiment of FIG. 6 comprises a notch 108 in the rear leading edge 76 for releasably engaging the external spring end 64 of the clock spring 38 when the travelling spring tab 44 rotates in the counter-clockwise direction with respect to the pivot shaft 32 axis of rotation such that the external spring end 64 of the clock spring 38 is released from the travelling spring tab 44.

Also shown in the embodiment of FIG. 6, an arbor plate pivot support 112 may be fixedly secured to the lower recliner bracket 34. The arbor plate pivot support 112 may be integrally formed with the lower recliner bracket 34, may be assembled with mechanical fasteners, or may be welded to the lower recliner bracket 34. The arbor plate pivot support 112 may further comprise a generally cylindrical boss (or hub) 120 with a central axis aligned with the axis of rotation of the pivot shaft 32. The boss 120 provides a rotational support for the arbor plate 52 relative to the lower recliner bracket 34. FIG. 6 further shows the stationary spring tab 50 fixedly secured to the lower recliner bracket 34. The stationary spring tab 50 may be attached to the lower recliner bracket 34 with a fastener, may be welded to the lower recliner bracket 34, or may be integrally formed with the lower recliner bracket 34.

Figure 7:
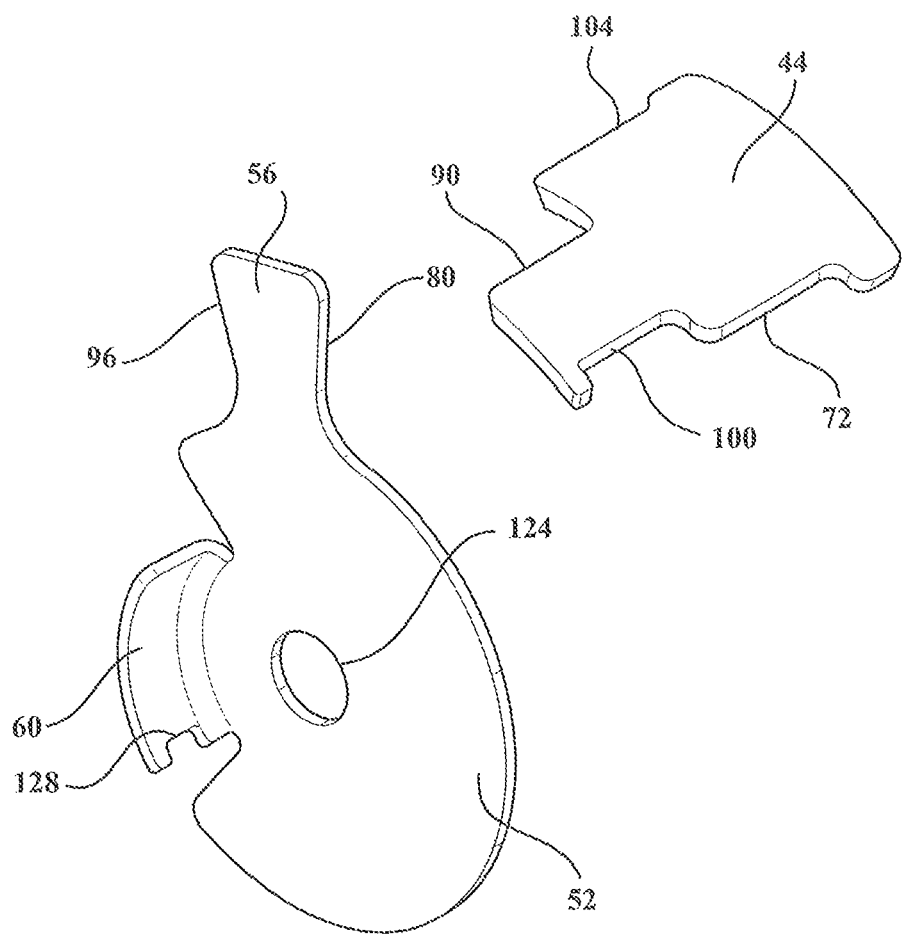
FIG. 7 is an exploded perspective view of the arbor plate and a travelling spring tab according to one aspect of the present invention as shown in FIG. 2.

Referring to FIG. 7, the arbor plate 52 may further comprise a central through hole 124 for receiving the cylindrical boss (or hub) 120 of the arbor plate pivot support 112. The arbor plate 52 may further comprise the arbor plate tab 56 having the rear leading edge 80 and the forward leading edge 96. The arbor plate 52 further includes the integral spring arbor 60 which retains the internal spring end 68 of the clock spring 38 when assembled. The spring arbor 60 may be integrally formed with the arbor plate 52 or may be mechanically fastened to the arbor plate 52. The spring arbor 60 may further comprise a notch 128 for retaining the internal spring end 68 of the clock spring 38.

Also shown in FIG. 7 is an embodiment of the travelling spring tab 44 which may be fixedly secured to the seat back frame member 28. The travelling spring tab 44 may be welded to the upper recliner bracket 35 (i.e. the seat back frame member 28). The travelling spring tab 44 may also be integrally formed with the seat back frame member 28. As shown in FIG. 7, the travelling spring tab 44 further comprises the backward edge 72 which engages with the rear stopper portion 86 of the lower recliner bracket 34 when the travelling spring tab 44 is rotated in the clockwise direction to the recline limit point RL. The travelling spring tab 44 includes the notch 100 in the backward edge 72 for releasably engaging with the external spring end 64 of the clock spring 38. The travelling spring tab 44 further includes the forward leading edge 90 which releasably engages the arbor plate tab 56 when the travelling spring tab 44 rotates in the counter-clockwise direction such that the forward leading edge 90 of the travelling spring tab 44 is positioned counter-clockwise with respect the axis of rotation of the pivot shaft 32 of the forward leading edge 82 of the stationary spring tab 50. The travelling spring tab 44 may further comprise the separate forward leading edge portion 104 which may engage the fold down stopper portion 92 in the lower recliner bracket 34 when the seat back frame member 28 is rotated in the counter-clockwise direction to the fold down point FD.

Figure 8:
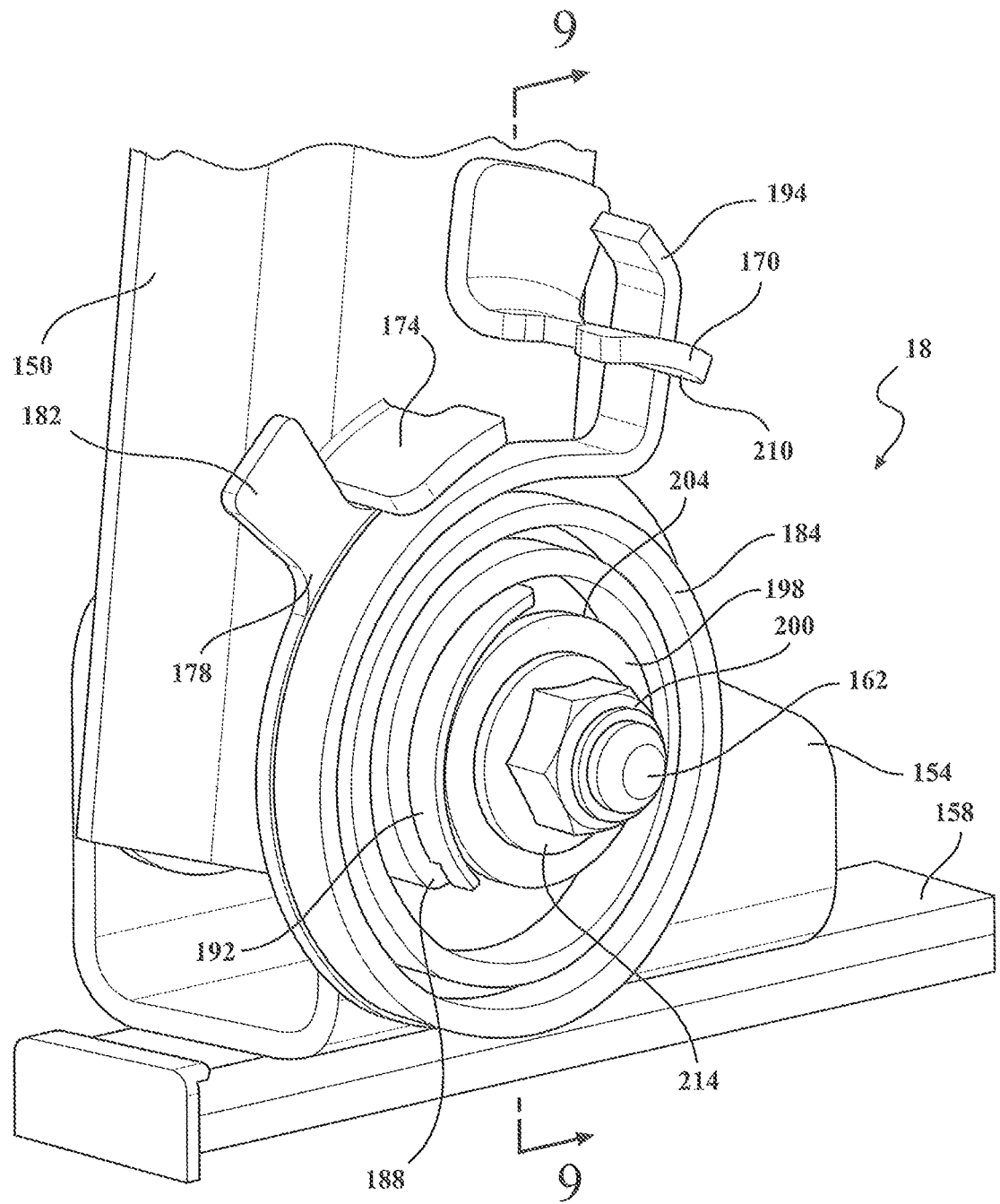
FIG. 8 is a perspective view of a front cushion leg of an automotive seat assembly having a reclining device pivotally joining the front cushion leg and a lower mounting flange according to an alternative embodiment of the invention.
Figure 9:
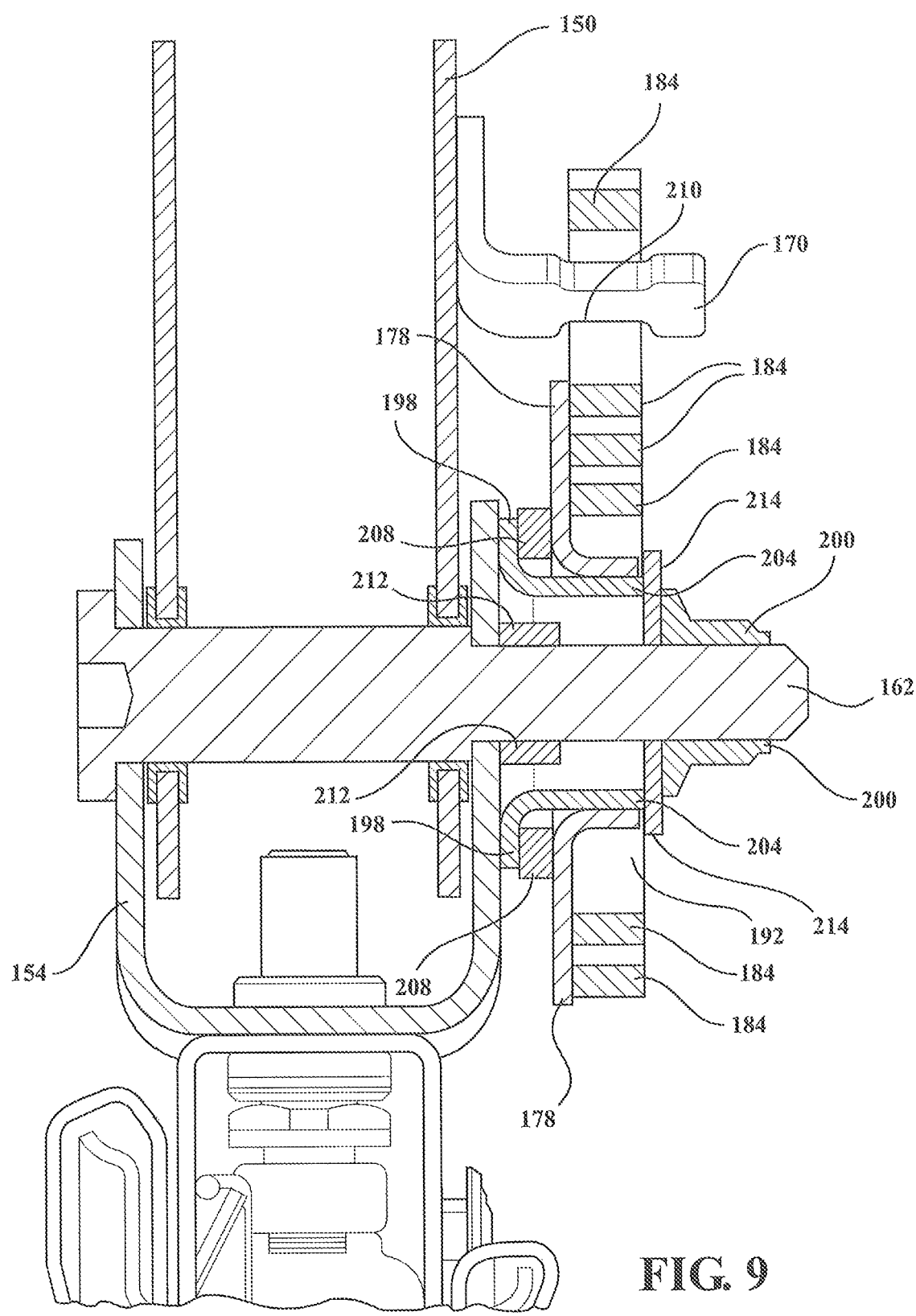
FIG. 9 is a cross-sectional view of the reclining device taken along line 9-9 in FIG. 8.

FIGS. 8 and 9 show an alternative embodiment of the present invention wherein the clock spring assembly 18 is operatively coupled between at least one front cushion leg 150 and a lower mounting flange 154 of the automotive seat 10. The clock spring assembly 18 of the alternative embodiment is provided for controlling, for example, pivotal movement of the seat 10 between an upright seating position spaced above the floor of the vehicle and a folded position pivoted forwardly and seated against the floor of the vehicle or stowed in a bin in the floor of the vehicle. FIG. 8 shows a perspective view of the front cushion leg 150 which comprises a clock spring assembly 18 joining the front cushion leg 150 and a lower mounting flange 154. The lower mounting flange 154 may be mounted to the floor of a vehicle or to a sliding rail 158 of a track assembly as is commonly known in the art. A pivot shaft 162 extends through the lower mounting flange 154 and the front cushion leg 150, the pivot shaft 162 having an axis of rotation about which the front cushion leg 150 rotates between one or more of a folded position and a full upright seating position.

As shown in FIG. 8, a travelling spring tab 170 is attached to the front cushion leg 150, a stationary spring tab 174 is rigidly attached to the lower mounting flange 154, a rotating arbor plate 178 is assembled onto the pivot shaft 162 with an arbor tab 182 releasably engaged with the stationary spring tab 174, and a clock spring 184 is assembled with the arbor plate 178 with an internal clock spring end 188 operationally coupled with a spring arbor 192 and an external clock spring end 194 releasably engaged with the travelling spring tab 170. The arbor plate 178 is assembled with an arbor plate pivot support 198 and a mechanical fastener 200 placed on the pivot shaft 162.

FIG. 9 shows a cross-sectional view taken along line 9-9 of FIG. 8. FIG. 9 shows the front cushion leg 150 and the lower mounting flange 154 assembled with the pivot shaft 162. A fastener (a nut, a retaining collar, retainer, or other fastener) 200 may be assembled onto the pivot shaft 162. The arbor plate pivot support 198 may be rigidly fastened to the lower mounting flange 154 with the central axis of a hub 204 of the arbor plate pivot support 198 aligned with the axis of rotation of the pivot shaft 162. The arbor plate pivot support 198 may be rigidly attached to the lower mounting flange 154 before or after the fastener 200 is assembled to the pivot shaft 162. The arbor plate pivot support 198 may be formed integrally with the lower mounting flange 154, may be welded (or rigidly attached through an alternate means such as an adhesive), or may be releasably attached to the lower mounting flange 154 using fasteners or other methods.

Optionally, as shown in the embodiment of FIG. 9, a bushing 208 may be assembled adjacent to the arbor plate pivot support 198 prior to assembling the arbor plate 178 over the arbor plate pivot support 198. The bushing 208, if used, may reduce the friction between the arbor plate 178 and the arbor plate pivot support 198. The optional bushing 208 may reduce wear and assist in positioning the arbor plate 178 with respect to the stationary spring tab 174 and the travelling spring tab 170.

Also shown in FIG. 9, the clock spring 184 may be assembled adjacent the arbor plate 178 with the external spring end 194 of the clock spring 184 engaged with a backward edge 210 of the travelling spring tab 170. A collar, nut, or bearing hub 212 may be assembled on the pivot shaft 162 to retain the positions of the front cushion leg 150 and the lower mounting flange 154 on the pivot shaft 162 and/or may provide a hub 212 about which the arbor plate 178 may rotate about the pivot shaft 162. A retaining washer 214 and a flanged nut 200 may be assembled to the pivot shaft 162 to retain the arbor plate 178 and clock spring 184 adjacent the arbor plate pivot support 198 as shown in FIG. 9. The operation of the coil spring assembly 18 of FIGS. 8 and 9 is the same as that as described in reference to FIGS. 1-7. However, the coil spring assembly 18 provides a multidirectional spring bias against the front cushion leg 150 in each of the clockwise and counter-clockwise pivotal directions about the pivot shaft 162 to assist in the pivotal movement of the seat 10 between the upright seating position and the folded position. It should be appreciated that the multidirectional reclining device and spring assembly may therefore be operatively coupled between any two pivotally interconnected members where it is desirable to provide opposite spring biasing forces against the members in each of the clockwise and counter-clockwise directions about a pivot axis.

Figure 10:
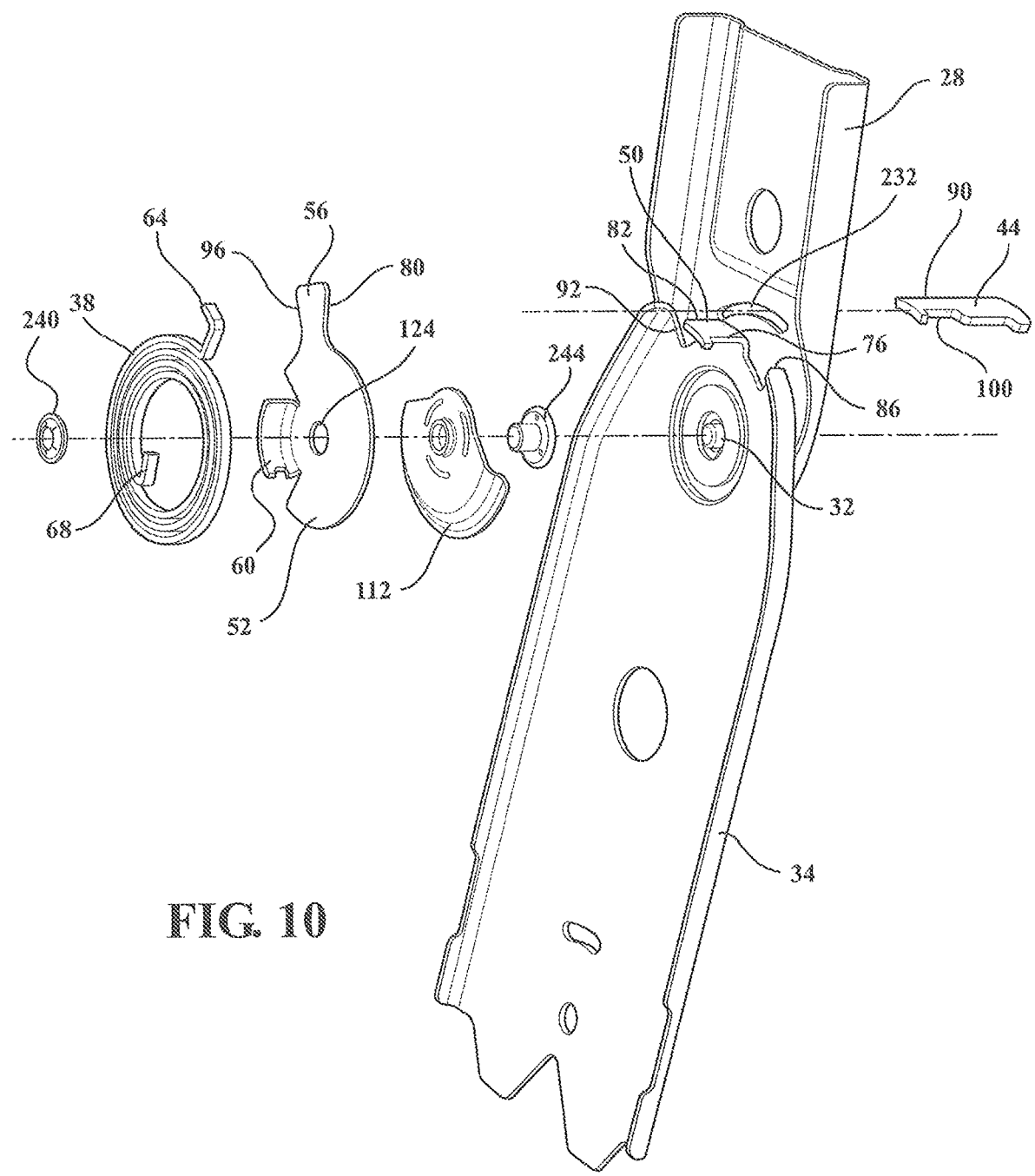
FIG. 10 shows an exploded view of a portion of the reclining device and the clock spring assembly according to yet another alternative embodiment of the invention.

FIG. 10 shows an exploded view of a portion of the clock spring assembly 18 according to another embodiment of the present invention. In this embodiment, the seat back frame member 28 is shown assembled on the pivot shaft 32 with the lower recliner bracket 34. The travelling spring tab 44 may be slid through a slot 232 in the seat back frame member 28 and mechanically fastened to the seat back frame member 28 by welding, a press-fit, or with a mechanical fastener (not shown). Alternatively, the travelling spring tab 44 may be integrally formed with the seat back frame member 28. The stationary spring tab 50 is shown integrally formed with the lower recliner bracket 34. However, the stationary spring tab 50 may also be formed as a separate piece and then mechanically fastened to the lower recliner bracket 34. FIG. 10 also shows the arbor plate pivot support 112, the lower recliner bracket 34 having the rear stopper portion 86 and the fold down stopper portion 92, and a support hub 244 wherein the arbor plate 52 may rotate on the support hub 244. The support hub 244 may comprise a bearing surface or may be formed in part from a low friction material such as such as polytetrafluoroethylene (PTFE), polyimide, polyetheretherketone (PEEK), polyphenylene sulfide (PPS), nylon, acetal, polyester, and/or similar low friction materials. The support hub 244 may also be formed from a plastic or metal and further comprise a collar, lining, or coating to reduce friction, wear, noise, and the like. The support hub 244 may be mechanically fastened to the lower recliner bracket 34 or the arbor plate pivot support 112. Alternatively, the support hub 244 or may be assembled with the pivot shaft 32. Also shown in FIG. 10 is the arbor plate 52 having the arbor plate tab 56 and the spring arbor 60, the clock spring 38, and a mechanical push-style retainer 240. In the embodiment shown in FIG. 10, a push-style retainer 240 may be used to hold the clock spring 38/arbor plate 52 assembly against the arbor plate pivot support 112 and the support hub 244.

Figure 11:
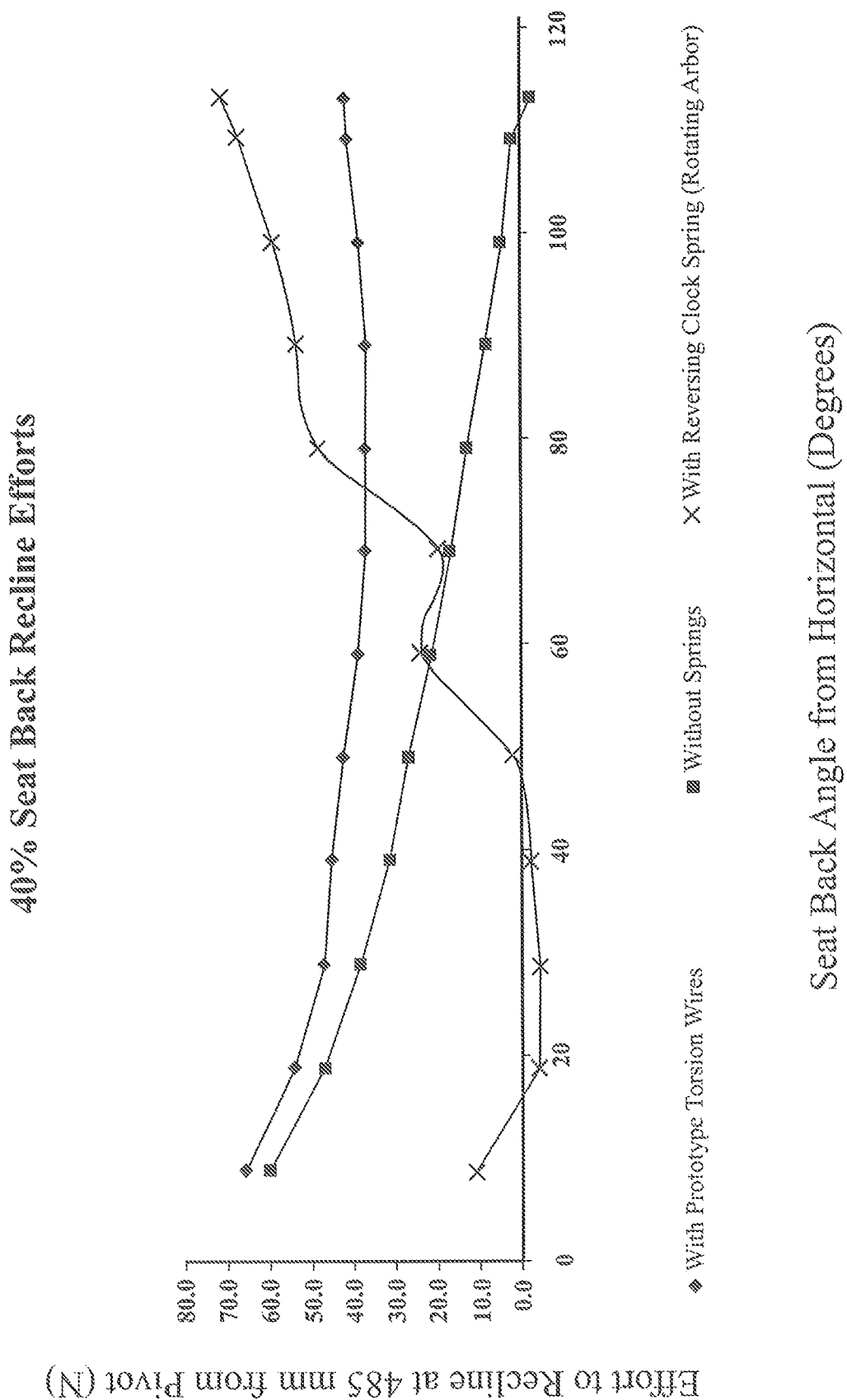
FIG. 11 shows an exemplary chart of the measured effort to raise the seat back from a fold flat position to an upright position according to one aspect of the present invention.

FIG. 11 shows a chart comparing an experimental amount of effort required for lifting the seat back 22 from an experimental fold flat position FD to an experimental full upright position FL for a seat back 22 which is configured with 1) the multidirectional clock spring assembly 18 with the rotating arbor 52, according to an embodiment of the current invention, in comparison to 2) a seat back 22 configured with torsion wires and 3) a seat back 22 configured without having springs. The Y-axis of this chart shows the effort to recline at about 485 mm from the pivot in Newtons N. The effort to recline is the effort to return the seat back 22 from the experimental fold flat position FD towards the experimental full upright position FL, also referred to as "seat back recline efforts". The X-axis shows the angular position of the seat back 22 with the experimental fold flat position FD being about 10 degrees from horizontal, the experimental full upright FL (i.e. transition point) being around 60 to 70 degrees from horizontal, and the experimental full recline position RL being represented by about 110 degrees from horizontal.

The experimental fold flat FD, full upright FL, and full recline positions RL are exemplary positions that may have a range of angular values depending on an actual configuration. For example, an alternate embodiment may have exemplary fold flat positions FD of 0 degrees, 30 degrees, or any other angular position suitable for a specific application. Likewise, an alternate embodiment may have exemplary full up right positions FL of 50 degrees, 80 degrees, 90 degrees, 120 degrees, or any other angular position suitable for a specific application. Further, an alternate embodiment may have exemplary full recline positions RL of 100 degrees, 120 degrees, 140 degrees, or any other angular position suitable for a specific application. FIG. 11 shows a representative comparison of the effort to lift the seat back 22 from the fold flat position FD plotted against the angular position for the configuration with the reclining device 14 having the clock spring assembly 18 according to an embodiment of the current invention in comparison to two alternate configurations lacking the clock spring assembly 18.

As shown in FIG. 11, both configurations lacking the clock spring assembly 18 require above 50 N to lift the seat back 22 above the fold flat position FD (at about 10 degrees above horizontal). Both of these configurations show a general trend of decreasing amount of effort as the angle above horizontal increases. At an angle of about 100 degrees above horizontal, the configuration with torsion springs required about 40 N of effort and the configuration without springs required about 10 N of effort.

In comparison, the configuration with the clock spring assembly 18 required about 10 N of effort at about 10 degrees above horizontal and about 60 N of effort at about 100 degrees above horizontal. The amount of effort to lift the seat back 22 from about 20 degrees above horizontal to about 50 degrees above horizontal is about +/−10 N. This is significantly less than the effort required to lift the configuration with torsion springs and the configuration without springs. The initial effort spike shown between 10 degrees and about 18 degrees above horizontal is due to the geometry of front links in the experimental configuration and this spike likely may not be expected with a typical structure design having an embodiment of the current invention. Also, in the experimental configuration shown in FIG. 11, the spring rate was higher than specified and marked on the drawing which resulted in high recline efforts by about 32%.

As shown in FIG. 11, the return from fold flat effort drops significantly with the experimental configuration with the clock spring assembly 18 according to an embodiment of the current invention in comparison to the alternate shown configurations lacking the clock spring assembly 18. The design is robust since the clock spring 38 never disengages from the tabs 44, 50, i.e. the external spring end 64 of the clock spring 38 is releasably engaged with the travelling spring tab 44 and/or the stationary spring tab 50 at all times. Further, the internal spring end 68 is continuously engaged with the spring arbor 60.

The above descriptions are considered that of preferred embodiments only. Modifications of the invention will occur to those skilled in the art and to those who make or use the invention. Therefore, it is understood that the embodiments shown in the drawings and described above is merely for illustrative purposes and not intended to limit the scope of the invention, which is defined by the following claims as interpreted according to the principles of patent law, including the Doctrine of Equivalents.

The invention claimed is:

1. A reclining device for an automotive seat, the reclining device having a multidirectional clock spring assembly with a rotating arbor and a clock spring; wherein:
    when the reclining device is in a full upright position, the clock spring assembly is in a transition position with the clock spring having a first amount of tension;
    when the reclining device is rotated in a first direction from the full upright position to a full recline position which repositions the clock spring assembly into the full recline position, the clock spring provides a second amount of tension to bias the reclining device towards the full upright position; and
    when the reclining device is rotated in a second direction from the full upright position to a fold flat position which repositions the clock spring assembly into the fold flat position, the clock spring provides a third amount of tension to bias the reclining device towards the full upright position.

2. The reclining device of claim 1, further comprising the multidirectional clock spring assembly with the rotating arbor operationally coupled between a seat back and a seat cushion.

3. The reclining device of claim 2, wherein when the seat back is rotated to the fold flat position, the tension in the clock spring assists in rotating the seat back from the fold flat position to the transition position.

4. The reclining device of claim 2, wherein rotating the seat back from the full upright position towards the full recline position increases the tension in the clock spring; and
    rotating the seat back from the full upright position towards the fold flat position increases the tension in the clock spring.

5. The reclining device of claim 1, further comprising the multidirectional clock spring assembly with rotating arbor operationally coupled to a front cushion leg of an automotive seat.

6. A multidirectional clock spring assembly for an automotive seat, the clock spring assembly comprising:
    a pivot shaft having an axis of rotation with a forward direction and a reverse direction of rotation;
    a travelling spring tab configured to rotate about the pivot shaft axis of rotation and positioned at a first radial distance from the pivot shaft axis of rotation and having a transition position, the travelling spring tab having a front leading edge and a rear leading edge;
    a stationary spring tab positioned at a second radial distance from the pivot shaft axis of rotation, the stationary spring tab comprising a forward leading edge and a reverse leading edge, and the reverse leading edge generally aligned with the rear leading edge when the travelling spring tab is in the transition position;
    an arbor plate configured to rotate about the pivot shaft axis of rotation, the arbor plate further comprising an arbor plate tab and a spring arbor, the arbor plate tab positioned at a third radial distance from the pivot shaft axis of rotation, and the spring arbor positioned at a fourth radial distance from the pivot shaft axis of rotation, the arbor plate tab configured to be releasably engagable with the travelling spring tab and with the stationary spring tab, wherein an arbor leading edge is releasably engaged with the forward leading edge of the stationary spring tab when the travelling spring tab is in the transition position; and
    a clock spring positioned adjacent the arbor plate and aligned with the pivot shaft axis of rotation, the clock spring having an internal spring end operatively connected to the spring arbor and an external spring end configured to be releasably engagable with the travelling spring tab and with the stationary spring tab;
    when the travelling spring tab is in the transition position the external spring end is releasably engaged with the reverse leading edge of the stationary spring tab and with the rear leading edge of the travelling spring tab, the arbor leading edge is releasably engaged with the forward leading edge of the stationary spring tab, and the clock spring has a first amount of tension;
    when the travelling spring tab rotates in the reverse direction away from the transition position, the external spring end disengages from the stationary spring tab and the external spring end is operationally engaged with the travelling spring tab; and
    when the travelling spring tab rotates in the forward direction away from the transition position, the external spring end disengages from the travelling spring tab and operationally engages with the stationary spring tab, the front leading edge of the travelling spring tab releasably engages with the arbor leading edge.

7. The multidirectional clock spring assembly of claim 6, wherein an increase in tension in the clock spring is proportional to an amount of movement of the travelling spring tab away from the transition position.

8. The multidirectional clock spring assembly of claim 6, further comprising the multidirectional clock spring assembly with rotating arbor operationally coupled to a front cushion leg of an automotive seat, wherein:
    the travelling spring tab is rigidly coupled to a front cushion leg and rotates about the pivot shaft axis of rotation when the front cushion leg is rotated about the pivot shaft axis of rotation; and
    the stationary spring tab is rigidly coupled to a lower mounting flange.

9. The multidirectional clock spring assembly of claim 6, further comprising a seat back operationally coupled to the pivot shaft and rotationally movable about the pivot shaft axis of rotation in the forward direction to a fold flat position and in the reverse direction to a full recline position;
    wherein the travelling spring tab is rigidly fastened to a portion of the seat back such that rotating the seat back about the axis of rotation moves the travelling spring tab about the axis of rotation; and
    when the travelling spring tab is in the transition position the seat back is in a full upright position.

10. The multidirectional clock spring assembly of claim 9, wherein the clock spring provides a forward biasing force when the seat back is rotated in the reverse direction to the full recline position.

11. The multidirectional clock spring assembly of claim 9, wherein the clock spring provides a rearward biasing force when the seat back is rotated in the forward direction to the fold flat position.

12. The multidirectional clock spring assembly of claim 9, when the seat back is rotated towards the fold flat position, the travelling spring tab rotates the arbor plate tab towards the fold flat position which rotates the spring arbor and repositions the internal spring end to increase the tension in the clock spring.

13. The multidirectional clock spring assembly of claim 9, wherein the tension in the clock spring is biased towards the full upright position when the seat back is rotated from the full upright position towards the fold flat position and when the seat back is rotated from the full upright position towards the full recline position.

14. The multidirectional clock spring assembly of claim 9, wherein the external spring end is operationally engaged with at least one of the stationary spring tab and the travelling spring tab while the travelling spring tab moves from the full recline position to the fold flat position.

15. The multidirectional clock spring assembly of claim 9, wherein when the seat back is rotated from the fold flat position to the full upright position, the travelling spring tab disengages from the arbor plate tab when the arbor plate tab releasably engages with the stationary spring tab.

16. The multidirectional clock spring assembly of claim 6, further comprising an arbor plate pivot support aligned with the axis of rotation, the arbor plate pivot support further comprising a cylindrical boss aligned with the axis of rotation to provide support to the arbor plate as the arbor plate rotates about the axis of rotation.

17. The multidirectional clock spring assembly of claim 16, further comprising a bushing positioned between the arbor plate pivot support and the arbor plate.

18. The multidirectional clock spring assembly of claim 17, wherein the arbor plate further comprises a through hole aligned with the axis of rotation which is supported by the cylindrical boss as the arbor plate is rotated about the axis of rotation.

19. The multidirectional clock spring assembly of claim 18, further comprising a retaining collar aligned with the cylindrical boss to maintain axial positions of the arbor plate pivot support, the bushing, and the arbor plate.

20. A multidirectional clock spring assembly for an automotive seat, the clock spring assembly comprising:
  a travelling spring tab rotationally attached to a lower support bracket, the travelling spring tab rotationally movable between a forward position and a rear position about an axis of rotation, the travelling spring tab further having a transition position between the forward position and the rear position;
  a stationary spring tab rigidly attached to the lower support bracket;
  an arbor plate configured to rotate about the axis of rotation, the arbor plate further comprising an arbor plate tab and a spring arbor, the arbor plate tab releasably engaged with the stationary spring tab when the travelling spring tab is in the rear position and when the travelling spring tab is in the transition position, and the arbor plate tab releasably engaged with the travelling spring tab and disengaged from the stationary spring tab when the travelling spring tab is in the forward position; and
  a clock spring positioned adjacent the arbor plate and having an internal spring end operationally connected to the spring arbor and an external spring end releasably engaged with the travelling spring tab when the travelling spring tab is in the transition position and in the rear position, and the external spring end disengaged from the travelling spring tab and releasably engaged with the stationary spring tab when the travelling spring tab is in the forward position;
    wherein the clock spring provides a first biasing force oriented towards the transition position when the travelling spring tab is in the rear position, and the clock spring provides a second biasing force oriented towards the transition position when the travelling spring tab is in the forward position.

\* \* \* \* \*